United States Patent [19]

Steinetz et al.

[11] Patent Number: 4,917,302

[45] Date of Patent: Apr. 17, 1990

[54] HIGH TEMPERATURE FLEXIBLE SEAL

[75] Inventors: Bruce M. Steinetz, Broadview Heights; Paul J. Sirocky, Middleburg Heights, both of Ohio

[73] Assignee: The United States of America as represented by the United States National Aeronautics and Space Administration, Washington, D.C.

[21] Appl. No.: 292,146

[22] Filed: Dec. 30, 1988

[51] Int. Cl.$^4$ .................. B64D 33/04; F16J 15/46
[52] U.S. Cl. ...................... 239/265.11; 277/34; 277/158
[58] Field of Search .............. 239/265.11, 265.19, 239/265.33, 265.37, 265.39; 60/271; 277/34, 34.3, 157, 158, 161

[56] References Cited

U.S. PATENT DOCUMENTS 4,705,722 11/1987 Ueda et al. .................... 428/365
4,783,085 11/1988 Wicks et al. ............. 239/265.11 X

FOREIGN PATENT DOCUMENTS 938639 1/1956 Fed. Rep. of Germany ..... 277/34.3

Primary Examiner—Andres Kashnikow
Assistant Examiner—William Grant
Attorney, Agent, or Firm—Gene E. Shook; James A. Mackin; John R. Manning

[57] ABSTRACT

This device is concerned with sealing the sliding interfaces between structural panels that are roughly perpendicular to each other or whose edges are butted against one another. The gap which the seal element must seal is not uniform along the seal length requiring significant seal flexibility.

The seal 10 is mounted in a rectangular groove 14 in a moveable structural panel 16. The seal comprises a plurality of rectangular shaped wafers 12 stacked next to one another and preloaded in the axial direction to minimize leakage between wafers. The wafers are laterally preloaded to maintain sealing contact along the wafer faces which engage the adjacent wall of a sidewall 18 using one of several approaches, such as the pressurized linear bellows 22. The seal accomodates distortions in the adjacent panel by relative sliding between adjacent wafers.

Leakage between wafers is further minimized with good wafer surface finishes. Leakage between the seal nose and the adjacent structural panel is minimized when sealing against a distorted sidewall with relatively thin wafers and suitable seal preload apparatus. Leakage behind the seal is minimized with good groove tolerances and good sealing contact between the preload system and the back of the peripheral edge of the wafers.

20 Claims, 4 Drawing Sheets

HIGH TEMPERATURE FLEXIBLE SEAL

ORIGIN OF THE INVENTION

The invention described herein was made by an employee of the United States Government, together with a contractor employee performing work under a NASA contract and is subject to the provisions of Section 305 of the National Aeronautics and Space Act of 1958, Public Law 85-568 (72 Statue 435; 42 U.S.C. 2457).

TECHNICAL FIELD

This invention is concerned with an improved flexible seal for operation at high temperatures. The invention is particularly concerned with sealing gaps between moveable engine panels and their adjacent engine sidewalls typical of ramjet and scramjet engines as well as two-dimensional turbojet exhaust nozzles.

Gaps caused by pressure and thermal loads on the weight-minimized relatively compliant engine sidewalls of these hypersonic engines may be as much as 0.4 cm in only a 46 cm span which requires a very compliant "serpentine" seal to conform to the sidewall deformations. Complicating the seal's function is the requirement to articulate the engine panel and seal, wiping the seal over bowed engine sidewalls while the engine is operating.

Flowpath conditions within these engines are extreme with static gas temperatures ranging from 650° C. to 2,760° C. and pressure differentials up to 490 kPa, depending on engine configuration and axial flowpath position within each engine. It is, therefore, a primary object of the present invention to prevent these hot pressurized flowpath gases containing hydrogen and oxygen from leaking past the moveable engine panels to back engine cavities that could cause loss of the engine or even the entire aircraft.

A further object of the invention is to provide a seal which conforms to expected engine sidewall distortions.

Another object of the invention is to provide a high temperature flexible seal which can operate at temperatures up to about 1260° C.

BACKGROUND ART

Ueda et al U.S. Pat. No. 4,705,722 is directed to a gland packing having a woven rope containing sheet material. This packing incorporates graphite sheets that are parallel to the axis of the seal and to its braided covering. Flexibility of the graphite sheet seal is derived by relative motion of the graphite sheets parallel to the axis of the seal. As the graphite sheet seal is wound about the outer periphery of the element to be sealed, the graphite sheets slide longitudinally over one another.

DISCLOSURE OF THE INVENTION

A flexible high temperature seal constructed in accordance with the present invention comprise stacked rectangular ceramic wafers mounted in a closely mating rectangular groove of a moveable structural panel. An important feature of the invention is the seal's flexibility which enables the seal element to seal against significantly distorted adjacent sidewalls. Test results have shown this seal can adequately seal against a wall whose distortion is 0.4 cm in a 46 cm span. The seal is preloaded lateral to its axis to maintains good sealing contact between the seal nose and the adjacent wall to ensure the ceramic follow the distorted sidewall.

The ceramic materials chosen for the ceramic wafers offer high operating temperatures up to 1260° C., and resistance to chemical attack by either the hydrogen or oxygen engine flowpath gases. Furthermore, the low weight density of the ceramic materials provides for a lightweight seal, less than half of the weight of a comparable seal made of superalloy materials.

BRIEF DESCRIPTION OF THE DRAWING

The objects, advantages and novel features of the invention will be more fully apparent from the following detailed description when read in connection with the accompanying drawings, wherein.

BEST MODE FOR CARRYING OUT THE INVENTION

Figure 1:
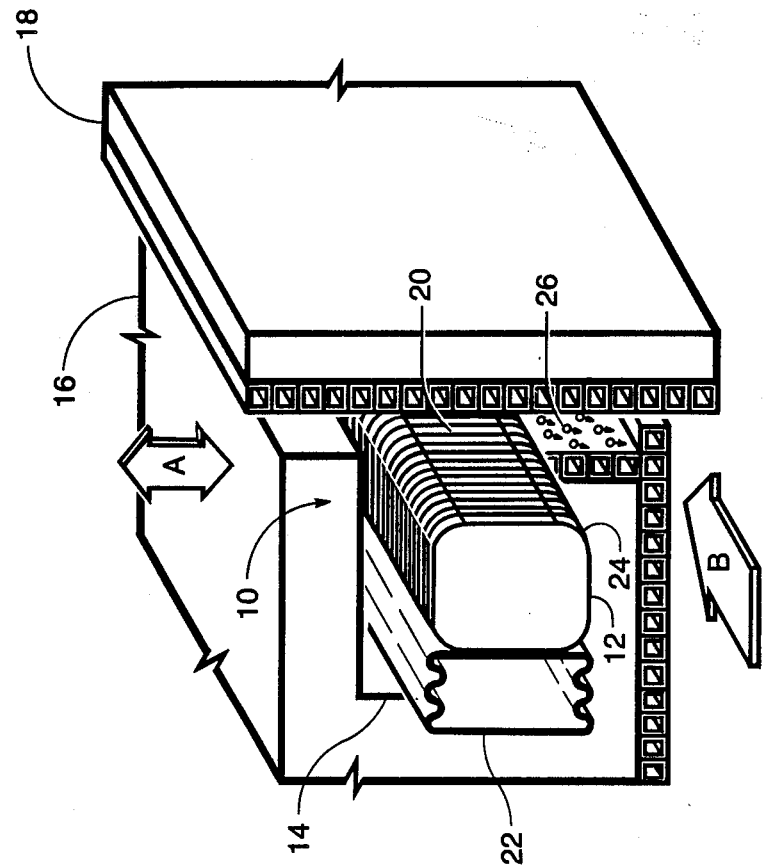
FIG. 1 is a perspective view of the dynamic, high-temperature ceramic-wafer flexible seal constructed in accordance with the invention.

Referring now to the drawing there is shown in FIG. 1, a seal 10 comprising a plurality of rectangular ceramic wafers 12 mounted in a rectangular groove 14 along the side of a moveable engine panel 16. The arrow A indicates the direction of motion of the panel 16 and the seal 10 as they traverse the adjacent sidewall 18.

The wafers 12 have opposite major surfaces in sliding engagement with major surfaces of contiguous wafers. The wafers 12 are preloaded in the axial direction with a suitable resilient means, such as a spring, to minimize leakage between wafers. The wafers are laterally preloaded by applying a pressure toward the sidewall 18 to a portion of the outer peripheral edge of each wafer 12 to maintain sealing contact between the face of the sidewall 18 and the portion 20 of the outer peripheral edge of each wafer that is adjacent to this face. A pressurized linear bellows 22 has been satisfactory for this preloading.

Wafers 12 that were in the form of plates 1.27 cm by 1.27 cm and 0.32 cm thick have been satisfactory. The wafer corners 24 were curved for smooth sliding operation against the adjacent sidewall 18. Wafer surface finishes were 0.5 μm to minimize leakage between major faces of contiguous wafers 12.

The wafers can be made of either monolithic or whisker reinforced engineering ceramics. Satisfactory wafer materials include $Al_2O_3$, $Si_3N_4$ or SiC ceramics. These materials have excellent high temperatures strength at 1260° C., and they are resistant to chemical attack by hydrogen and oxygen present in the flowpath gases whose flow direction is indicated by the arrow B. Furthermore, these ceramic materials have improved thermal shock resistance and fracture toughness when reinforced with SiC whiskers.

At axial engine stations where static gas temperatures exceed the operating temperatures of the wafer material, film cooling 26 can be introduced to maintain seal operating temperature below 1260° C. It is further apparent that wafer size, shape, material, preload, surface finishes, and cooling technique are all parameters that can be tailored for specific applications.

DESCRIPTION OF AN ALTERNATE EMBODIMENT

Figure 2:
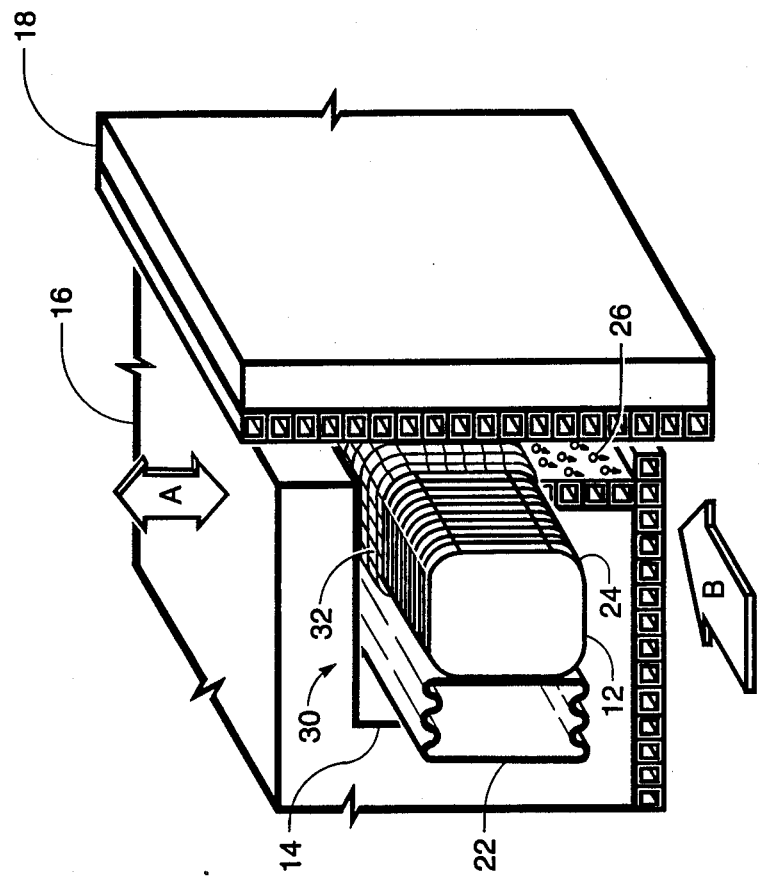
FIG. 2 is an alternate embodiment of the seal constructed in accordance with the invention with the ceramic wafers inserted in a flexible ceramic sleeve.

Referring now to FIG. 2, there is shown a seal 30 comprising a plurality of ceramic wafers 12 inserted in a high-temperature braided or woven ceramic sleeve 32 forming a compliant layer at the sealing contact between the ceramic wafers 12 and the adjacent sidewall 18. The seal 30 is inserted into a rectangular groove 14 and seals the gap between the moveable panel 16 and the adjacent sidewall 18 in the same manner as in FIG. 1. Movement of the panel 16 and the seal 30 is shown by the arrow A. Direction of the flowpath gases containing hydrogen and oxygen is indicated by the arrow B.

A ceramic sleeve 32 constructed from a plain braid of alumina-boria-silicate yarns having a thickness of 0.08 cm is satisfactory. These ceramic fibers maintain strength and flexibility to temperatures up to 1260° C. It is contemplated that other sleeve construction techniques and thicknesses can be used to optimize leakage performance.

Room temperature leakage tests were conducted with each of the seal embodiments described using a special test fixture. Air leakage rates were measured as a function of pressure drop across the seal, lateral seal preload, and adjacent wall condition. Results of these tests are shown in FIG. 3 for the straight wall condition where the sealed gap is 0.32 cm wide.

Figure 4:
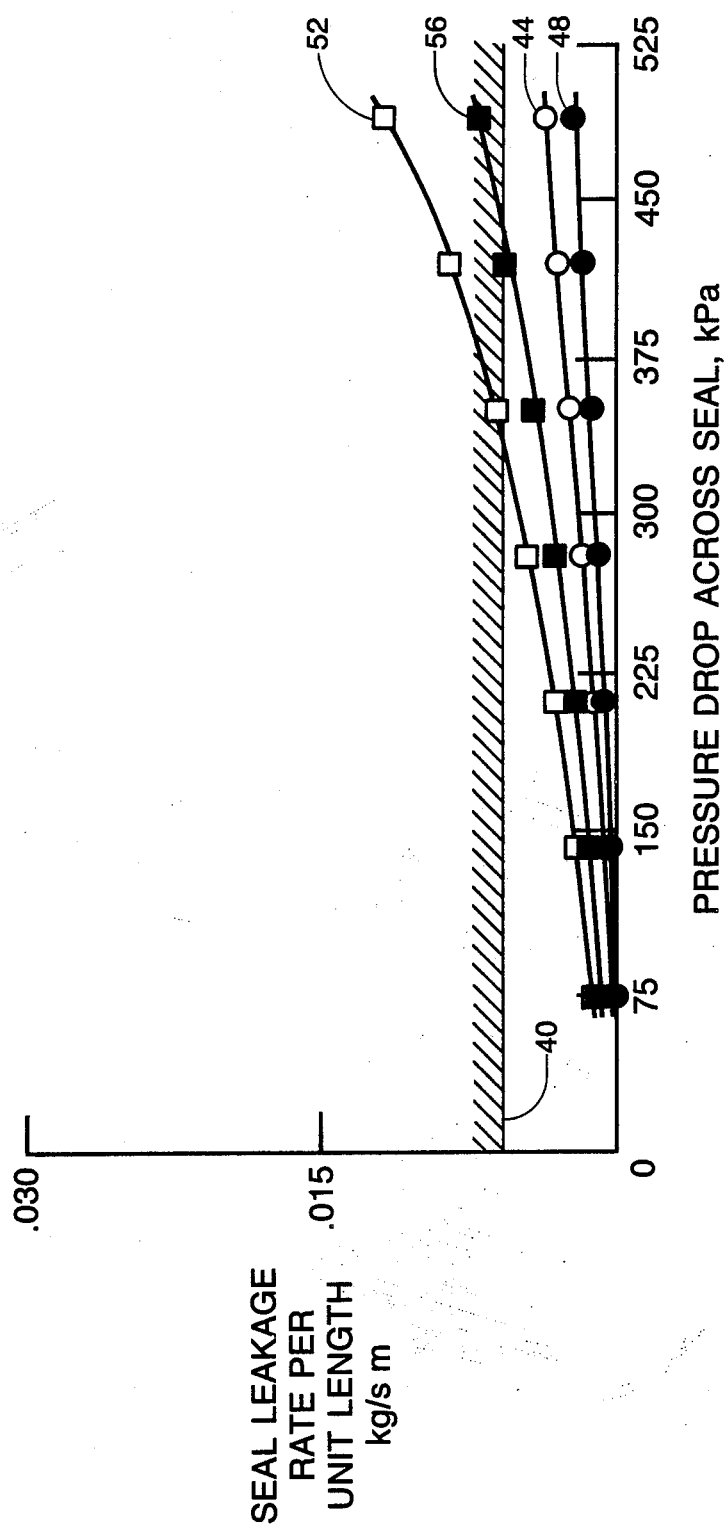
FIG. 4 is a graph showing the relationship between seal leakage rates and pressure drops across the seals for two lateral seal preloads when sealing is simulated distorted adjacent sidewall. The sealed gap is sinusoidal in nature having a 0.08 cm width at the midpoint and 0.48 cm widths at opposed ends. Results are presented for the ceramic wafer seal shown in FIG. 1 and the ceramic wafer/ceramic sleeve shown in FIG. 2.

Leakage results are shown in FIG. 4 for the engine-simulated wavey wall condition where the sealed gap was sinusoidal in nature with a 0.08 cm width at the midpoint and 0.48 cm widths at opposed ends.

Figure 3:
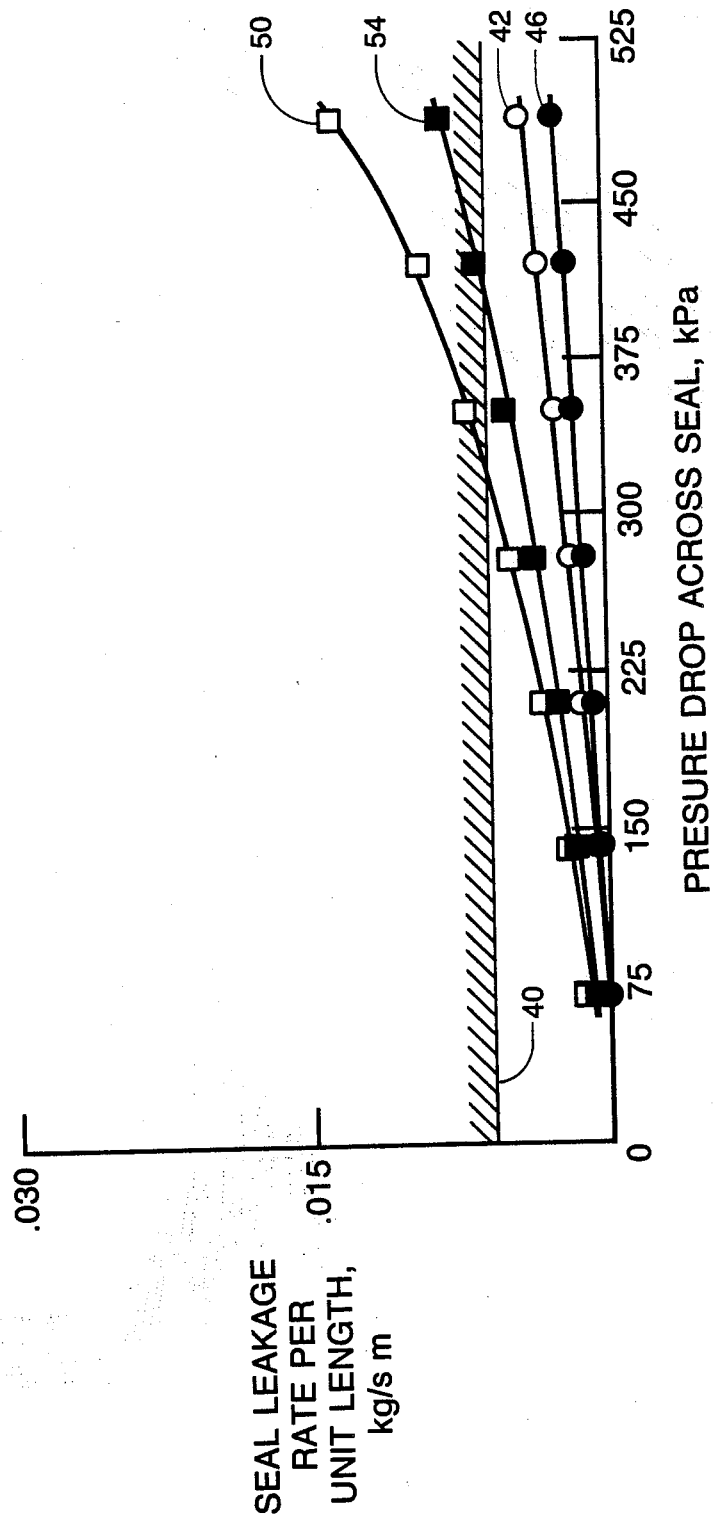
FIG. 3 is a graph showing the relationship between seal leakage rates and pressure drops across the seals for two lateral seal preloads when sealing a straight gap 0.32 cm wide. Results are presented for the ceramic wafer seal shown in FIG. 1 and the ceramic wafer/ceramic sleeve seal shown in FIG. 2.

The leakage of the ceramic wafer seal shown in FIG. 1 is denoted by circles in FIG. 3 and FIG. 4. This leakage was less than the leakage limit shown as a crosshatched horizontal line 40 in both FIGS. 3 and 4 for all measured combination of pressure differential, seal preload and adjacent wall condition, demonstrating the excellent versatility of this seal. The seal preload for the open circles 42 in FIG. 3 and 44 in FIG. 4 was 560 kPa. The seal preload for the closed circles 46 in FIG. 3 and 48 in FIG. 4 was 980 kPa.

To predict the effects of sealed gas temperature on seal leakage rates, a mathmatical model was developed. The model relates leakage flow rate to: gas pressure; temperature; and viscosity; as well as to seal size; length; and apparent seal leakage gap. In this model the leakage rate m is inversely proportional to the gas viscosity $\mu$, and temperature T. Because gas viscosity varies with temperature raised to the two-thirds power ($\mu \propto T^{2/3}$) seal leakage is inversely proportional to temperature to the five-thirds power ($m \propto T^{-5/3}$). The important prediction is for a constant small seal leakage gap, and for constant pressure and seal geometry conditions, the ceramic wafer seal leakage flow rate at elevated temperatures will be less than that measured herein, at room temperature.

The measured leakage rates of the ceramic wafer/ceramic sleeve seal shown in FIG. 2 are denoted by square symbols in FIG. 3 and FIG. 4. These rates were lower than the leakage limit for pressure differentials less than 320 kPa for both straight and distorted wall conditions when preloaded to 560 kPa. This preload is used with the open squares 50 in FIG. 3 and 52 in FIG. 4. Increasing the preload to 980 kPa increased by a third the pressure differential for which the seal meets the leakage limit. This 980 kPa preload is used with the closed squares 54 in FIG. 3 and 56 in FIG. 4. As was expected the leakage of this seal is higher than that of the ceramic wafer seal because of the porosity of the ceramic sleeve.

The preliminary distinction between the gland packing of the prior art and the present invention lies in four major categories: (1) basic construction and flexibility, (2) materials, (3) preferred embodiment, and (4) application. In the present invention the major surfaces of the wafers that are in sliding engagement are substantially perpendicular to the sidewall against which the wafers are in sealing contact. The major surfaces of the graphite sheets of the prior art are parallel to the surfaces against which the gland packing is in sealing contact. Flexibility of the ceramic wafer seal is derived by relative sliding between the major surfaces of adjacent wafers and is designed to accommodate and seal gaps occurring transverse to the seal. Flexibility of the graphite-sheet seal of the prior art is derived by: (1) relative motion of the graphite sheets parallel to the surfaces against which the gland packing is in sealing contact and (2) through compressibility of the aramid fiber sleeves.

The wafers in the present invention are fabricated of engineered ceramics such as $Al_2O_3$, $Si_3N_4$ or SiC. These materials can operate to temperatures 1000° C. higher than the aramid fibers covering the graphite sheets of the prior art.

In the present invention the ceramic wafers in the gap between the moveable panel and the adjacent sidewall is the seal. The preferred embodiment of the graphite sheet with aramid covering or so-called knitting thread is made by further twisting or braiding it with other similar elements forming a cord-like seal structure.

The present ceramic wafer seal invention is designed to seal gaps between structural panels. Applications range from moveable panels in ramjet/scramjet engines to 2-dimensional converging/diverging nozzles to reentry vehicle seal, etc., where high-temperature flexible seals are required to operate up to 1260° C. The prior graphite-sheet invention is used for relatively low temperatures applications below 300° C. as an annular seal around a shaft or as a ring-shaped gland packing for a valve.

While several embodiments of the high temperature flexible seal have been disclosed, it will be appreciated that various structural modifications may be made without departing from the spirit of the invention or the scope of the subjoined claims. By way of example, it is contemplated that a seal embodying the features of this invention may be used to seal the gap between a moveable airframe panel and the body of a hypersonic vehicle airframe.

We claim:

1. Apparatus for sealing a gap between a moveable panel and an adjacent sidewall spaced therefrom to inhibit leakage of gases from a high pressure side to a low pressure side, said apparatus comprising a plurality of contiguous members in said gap having opposite major surfaces in sliding engagement with major surfaces of adjacent members, said surfaces being substantially parallel to the direction of potential leakage from said high pressure side to said low pressure side, and means for applying a pressure toward said sidewall to a portion of the outer peripheral edge of said of said members to form a seal between said sidewall and another portion of said outer peripheral edge which faces said sidewall.

2. Apparatus for sealing a gap between a moveable panel and an adjacent sidewall spaced therefrom in a two-dimensional turbojet exhaust nozzle to inhibit leakage of gases when the gap is produced by pressure and thermal loads, said apparatus comprising a plurality of contiguous members in said gap having opposite major surfaces in sliding engagement with major surfaces of adjacent members, said surfaces being substantially perpendicular to said sidewall, and means for applying a pressure toward said sidewall to a portion of the outer peripheral edges of each of said members to form a seal between said sidewall and another portion of said outer peripheral edge which faces said sidewall.

3. Apparatus for sealing a gap between a moveable panel and an adjacent sidewall spaced therefrom on a hypersonic engine to inhibit leakage of gases when the gap is produced by pressure and thermal loads, said apparatus comprising a plurality of contiguous members in said gap having opposite major surfaces in sliding engagement with major surfaces of adjacent members, said surfaces being substantially perpendicular to said sidewall, and means for applying a pressure toward said sidewall to a portion of the outer peripheral edge of each of said members to form a seal between said sidewall.

4. Sealing apparatus as claimed in claim 3 wherein the panel and sidewall are on a ramjet engine and the surface of the sideall is distorted during operation of the same.

5. Sealing apparatus as claimed in claim 3 wherein the panel and sidewall are on a scramjet engine and the surface of the sidewall is distorted during operation of the same.

6. Sealing apparatus as claimed in claim 3 wherein static gas temperatures within said engine are up to about 1260° C.

7. Sealing apparatus as claimed in claim 3 wherein the pressure differential across the contiguous members is about 490 kPa.

8. Sealing apparatus as claimed in claim 1 wherein the members are of a ceramic material.

9. Sealing apparatus as claimed in claim 8 wherein the members are of a monolithic ceramic material selected from the group consisting essentially of $Al_2O_3$, $Si_3N_4$, and SiC.

10. Sealing apparatus as claimed in claim 8 wherein the ceramic members are reinforced with whiskers.

11. Apparatus for sealing a gap between a moveable panel and an adjacent sidewall spaced therefrom to inhibit leakage of gases, said apparatus comprising a plurality of stacked wafers in said gap having opposite major surfaces in sliding engagement with major surfaces of adjacent wafers, said surfaces being substantially perpendicular to said sidewall, a compliant layer between said stacked wafers and said sidewall, means for applying a pressure toward said sidewall to a portion of the outer peripheral edge of each of said wafers to form a seal between said sidewall and another portion of said outer peripheral edge which faces said sidewall, and means for preloading said wafers in the axial direction to minimize leakage therebetween.

12. Sealing apparatus as claimed in claim 11 wherein the compliant layer is constructed of a plain braid of alumina-boria-silicate yarns.

13. Sealing apparatus as claimed in claim 12 wherein the yarns have a thickness of about 0.08 cm.

14. Sealing apparatus as claimed in claim 11 including a pressurized bellows for applying a force to a portion of the outer peripheral edge of each of said wafers to move the same toward said sidewall.

15. Sealing apparatus as claimed in claim 14 wherein the corners of the wafers are curved for smooth sliding over the adjacent sidewall.

16. Sealing apparatus as claimed in claim 15 wherein the wafer surfaces have finishes of about 0.5 $\mu$m to minimize leakage therebetween.

17. In a flexible seal for inhibiting leakage of gases through a gap between a moveable panel and an adjacent sidewall when said sidewall becomes significantly distorted in which passage of said gases is blocked by a plurality of moveable plates, the improvement comprising a groove along the side of said moveable panel adjacent to said gap for mounting said plates in stacked relationship in a sleeve with the major surfaces thereof being substantially perpendicular to said sidewall and in contact with one another and oriented for preloading in the axial direction thereby minimizing leakage between said surfaces, and means for urging said plates in a direction normal to said axial direction toward said sidewall.

18. A flexible seal as claimed in claim 17 including a bellows in said groove for moving said plates toward said sidewall with a predetermined preload.

19. A flexible seal as claimed in claim 18 wherein the preload is about 560 kPa.

20. A flexible seal as claimed in claim 18 wherein the preload is about 980 kPa.

* * * * *